(12) United States Patent
Pankaj et al.

(10) Patent No.: US 11,606,901 B2
(45) Date of Patent: Mar. 21, 2023

(54) SPEED CONTROL METHOD AND SYSTEM FOR HARVESTER

(71) Applicant: CNH Industrial America LLC, New Holland, PA (US)

(72) Inventors: Madhu Pankaj, West Chester, PA (US); Robert L. Fackler, Ephrata, PA (US); Steven C. Young, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 964 days.

(21) Appl. No.: 16/427,518

(22) Filed: May 31, 2019

(65) Prior Publication Data

US 2020/0375092 A1    Dec. 3, 2020

(51) Int. Cl.
*A01D 34/00* (2006.01)
*A01D 41/14* (2006.01)
*A01D 69/00* (2006.01)
*A01D 41/127* (2006.01)
*A01D 34/56* (2006.01)

(52) U.S. Cl.
CPC ....... *A01D 41/1274* (2013.01); *A01D 34/006* (2013.01); *A01D 41/141* (2013.01); *A01D 69/005* (2013.01); *A01D 34/56* (2013.01)

(58) Field of Classification Search
CPC ................ A01D 34/006; A01D 41/141; A01D 41/1274; A01D 69/005
See application file for complete search history.

(56) References Cited

U.S. PATENT DOCUMENTS

| | | | |
|---|---|---|---|
| 4,542,802 A * | 9/1985 | Garvey | B60W 30/18 60/449 |
| 7,261,632 B2 | 8/2007 | Pirro et al. | |
| 9,668,419 B2 | 6/2017 | Soldan et al. | |
| 9,872,433 B2 | 1/2018 | Acheson et al. | |
| 2005/0193698 A1* | 9/2005 | Teijido | A01D 69/005 56/10.9 |
| 2008/0034720 A1 | 2/2008 | Helfrich et al. | |
| 2015/0181808 A1* | 7/2015 | Johnson | A01F 12/444 56/122 |
| 2016/0262307 A1* | 9/2016 | Smith | A01D 41/12 |
| 2018/0084714 A1 | 3/2018 | Nafziger et al. | |
| 2018/0196441 A1 | 7/2018 | Muench et al. | |
| 2019/0183048 A1* | 6/2019 | Flintoft | A01D 34/246 |

FOREIGN PATENT DOCUMENTS

| | | | | |
|---|---|---|---|---|
| EP | 1419687 B1 * | 10/2006 | ......... | A01D 41/1274 |
| EP | 1946631 B1 * | 3/2011 | ......... | A01D 41/1274 |
| WO | WO-2015116892 A1 * | 8/2015 | ........... | A01D 41/127 |

* cited by examiner

*Primary Examiner* — Alicia Torres
(74) *Attorney, Agent, or Firm* — Peter Zacharias; Patrick Sheldrake

(57) ABSTRACT

A method of autonomously controlling the ground speed of a harvester, such as a self-propelled or towed wind rower, uses both the engine speed and the header speed as control parameters to increase or decrease the ground speed as necessary to maintain efficient harvester operation over varying terrain and crop conditions. A control system includes a controller which receives signals from sensors indicative of engine speed, header speed and harvester ground speed and uses actuators to control the header speed, engine speed and harvester ground speed. An operator interface permits an operator to engage or disengage the autonomous mode of control system operation, as well as to directly control the harvester.

18 Claims, 5 Drawing Sheets

66 —
- Setting a Maximum Ground Speed
- Measuring a Current Ground Speed
- Measuring Engine Speed
- Measuring Header Speed
- Increasing or Decreasing Said Current Ground Speed of Said Harvester in Response to Said Engine and Said Header Speed 68 —
Increasing Said Current Ground Speed If Said Current Ground Speed is Less than Said Maximum Ground Speed, and Said Engine Speed is Greater than an Engine Speed Lower Limit, and Said Header Speed is Greater than a Header Speed Lower Limit 70 —
Increasing Said Engine Speed If Said Engine Speed is Less than an Engine Speed Upper Limit, and Said Header Speed is Greater than a Header Speed Lower Limit 72 —
Decreasing Said Current Ground Speed If Said Current Ground Speed is Greater than Said Maximum Ground Speed 74 —
Decreasing Said Current Ground Speed If Said Engine Speed is Less than an Engine Speed Lower Limit 76 —
Decreasing Said Current Ground Speed If Said Header Speed is Less than a Header Speed Lower Limit 78 —
Determining a Rate of Decrease of Said Current Ground Speed
Decreasing Said Current Ground Speed at Said Rate of Decrease 80 —
Increasing Said Current Ground Speed If Header Speed is Greater than a Header Speed Lower Limit and Less than a Header Speed Upper Limit by a Predetermined Amount 82 —
Determining a Rate of Increase of Said Current Ground Speed
Increasing Said Current Ground Speed at Said Rate of Increase

FIG. 3

SPEED CONTROL METHOD AND SYSTEM FOR HARVESTER

FIELD OF THE INVENTION

This invention relates to control systems and methods for harvesters such as windrowers, including self-propelled windrowers and tractor towed wind rowers.

BACKGROUND

It is a challenge to operate a harvester efficiently, as it requires a human operator to manage numerous variables such as engine speed, header speed, and the harvester ground speed against various environmental factors such as the roughness and incline of the terrain over which the harvester moves, as well as the crop conditions (nature of the crop and moisture content). Each of these factors will affect the harvester differently and harvester operation becomes a difficult balancing act to control the various parameters while safely operating the harvester within the limits of engine speed while maintaining an optimal ground speed and a header speed which ensures maximum harvesting efficiency. There is clearly an opportunity to improve harvester operation through autonomous control, leaving the human operator with only the duty to steer.

SUMMARY

The invention concerns a method for controlling the ground speed of a harvester. The harvester comprises an engine and a header. In one example embodiment the method comprises:
  setting a maximum ground speed;
  measuring a current ground speed;
  measuring engine speed;
  measuring header speed;
  increasing or decreasing the current ground speed of the harvester in response to the engine speed and the header speed.

An example method may further comprise increasing the current ground speed if the current ground speed is less than the maximum ground speed, and the engine speed is greater than an engine speed lower limit, and the header speed is greater than a header speed lower limit.

Another example method may further comprise increasing the engine speed if the engine speed is less than an engine speed upper limit and the header speed is greater than a header speed lower limit.

Further by way of example, the method may comprise decreasing the current ground speed if the current ground speed is greater than the maximum ground speed.

An example embodiment further comprises decreasing the current ground speed if the engine speed is less than an engine speed lower limit.

An example embodiment may further comprise decreasing the current ground speed if the header speed is less than a header speed lower limit.

An example method according to the invention may further comprise:
  determining a rate of decrease of the current ground speed; and
  decreasing the current ground speed at the rate of decrease.

An example method may comprise increasing the current ground speed if the header speed is greater than a header speed lower limit and less than a header speed upper limit by a predetermined amount.

By way of example a method may further comprise:
  determining a rate of increase of the current ground speed; and
  increasing the current ground speed at the rate of increase.

The invention further encompasses a harvester. In an example embodiment the harvester comprises a chassis having an engine and a plurality of wheels mounted thereon. A motive drive system operatively connects the engine with at least one of the wheels for rotation thereof. A header is attached to the chassis. The header has rotating elements. A header drive system operatively connects the engine with the header for rotation of the rotating elements. A control system is also included, the control system comprising an engine speed sensor for measuring engine speed, a header speed sensor for measuring rotational speed of the rotating elements a speed sensor for measuring a current ground speed of the harvester, an engine actuator for controlling the engine speed, a header actuator for controlling the header speed, a speed actuator for controlling the current ground speed of the harvester, a controller including resident software. The controller is in communication with the engine speed sensor, the header speed sensor, and the speed sensor and receives signals therefrom. The controller is in communication with the actuators for sending signals thereto. The controller and the software are adapted to control the current ground speed of the harvester in response to the engine speed and the header speed.

In an example harvester according to the invention, the controller is adapted to increase the current ground speed if the current ground speed is less than a maximum ground speed, and the engine speed is greater than an engine speed lower limit, and the header speed is greater than a header speed lower limit.

In another example the controller is adapted to increase the engine speed if the engine speed is less than an engine speed upper limit and the header speed is greater than a header speed lower limit.

In yet another example the controller is adapted to decrease the current ground speed if the current ground speed is greater than a maximum ground speed.

By way of example the controller may be further adapted to decrease the current ground speed if the engine speed is less than an engine speed lower limit.

In another example embodiment the controller is adapted to decrease the current ground speed if the header speed is less than a header speed lower limit.

An example harvester may further comprise an operator interface providing communication between an operator of the harvester and the controller. The controller is adapted to decrease the current ground speed at a rate of decrease determined by the operator of the harvester.

In a further example the controller is adapted to increase the current ground speed if the header speed is greater than a header speed lower limit and less than a header speed upper limit by a predetermined amount.

An example harvester may further comprise an operator interface providing communication between an operator of the harvester and the controller. The controller is adapted to increase the current ground speed at a rate of increase determined by the operator of the harvester.

In one example embodiment the header is mounted on the chassis. In another example embodiment the header is attached to the chassis and towed thereby.

BRIEF DESCRIPTION OF THE DRAWINGS

FIG. 3 is a flow chart which illustrates steps of an example method according to the invention.

DETAILED DESCRIPTION

Figure 1:
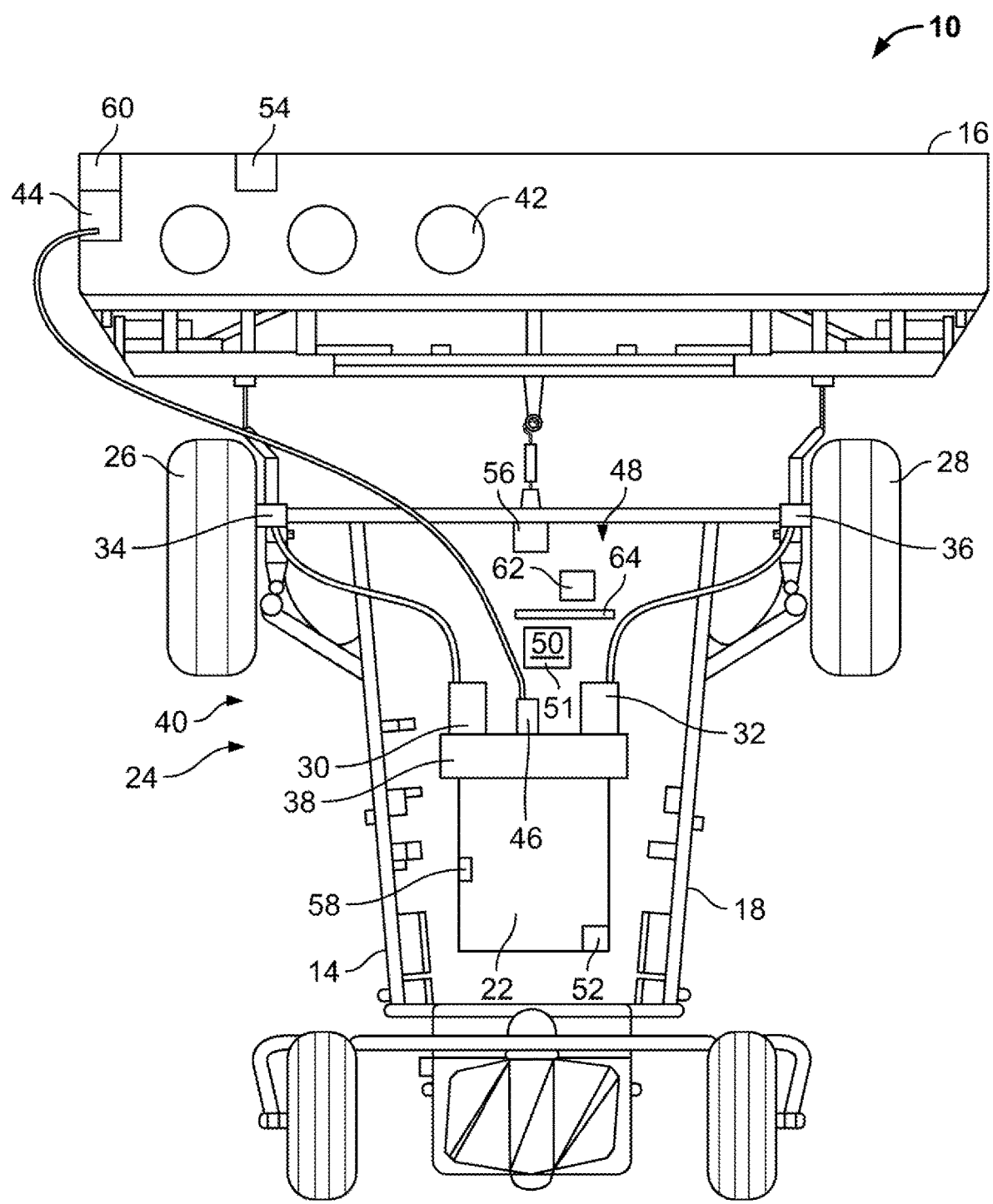
FIG. 1 is a plan view of an example harvester using a control system according to the invention.
Figure 2:
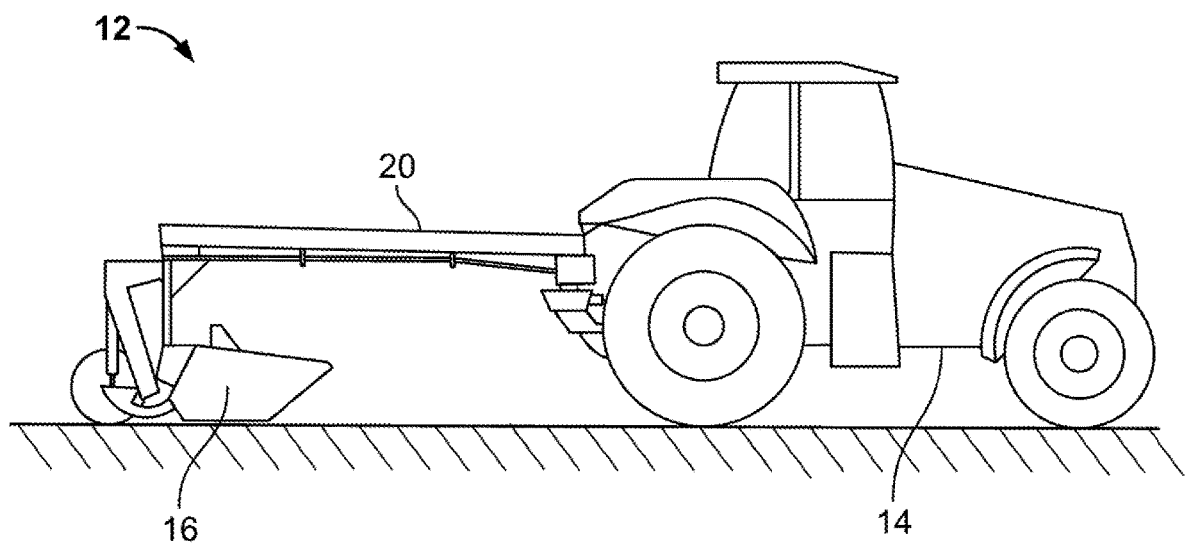
FIG. 2 is a side view of an example harvester using a control system according to the invention.

FIGS. 1 and 2 show example harvesters 10 and 12, in these examples, windrowers comprising a tractor 14 and a header 16. FIG. 1 illustrates a "self-propelled" harvester 10 wherein the header 16 is mounted on a chassis 18 of the tractor 14. In the harvester embodiment 12 of FIG. 2 the header 14 is attached to the chassis 18 of the tractor 14 by a tongue 20 and towed behind the tractor. The invention is described herein with reference to harvester 10, it being understood that the descriptions also apply to harvester 12.

As further shown in FIG. 1, an engine 22 is mounted on chassis 18. Engine 22 may be a gasoline or a diesel engine and provides motive power for the tractor 14, operating power for the header 16 as well as electrical power for the harvester's electrical components by turning a generator (not shown) also mounted on the chassis as is well understood. Motive power is provided by a motive drive system 24 which operatively connects the engine with the driven wheels 26 and 28 mounted on chassis 18. In this example the motive drive system comprises left and right hydraulic pumps 30, 32 in fluid communication with left and right hydraulic motors 34, 36. Motor 34 drives the right wheel 26 and motor 36 drives the left wheel 28. The pumps 30 and 32 are driven by the engine 22 through a gearbox 38. Other types of drive systems are of course feasible. Header operating power is provided by a header drive system 40. In this example embodiment rotating elements 42 within the header 16 which cut the crop being harvested are driven by a hydraulic motor 44 mounted on the header. Hydraulic motor 44 is driven by a hydraulic pump 46, pump 46 being driven by engine 22 through gearbox 38.

Harvester 10 further comprises a control system 48. Control system 48 includes a controller 50, for example, a programmable logic controller or other microprocessor based device. Software 51 resident on the controller 50 executes algorithms which, in this invention, autonomously control the ground speed of the harvester as a function of the engine speed (measured in crankshaft rpm) and header speed (measured in rotating element rpm). The engine speed is measured by an engine rpm sensor 52 which is in communication with controller 50. Signals from sensor 52 indicative of engine speed are received by the controller and used in the algorithms to control the ground speed of the harvester. The header speed is measured by a header rpm sensor 54 which is in communication with controller 50. Signals from sensor 54 indicative of header speed are received by the controller and used in the algorithms to control the ground speed of the harvester. The current ground speed of harvester 10 is measured by a speed sensor 56 which is in communication with controller 50. Signals from sensor 56 indicative of the harvester's current ground speed are received by the controller and used in the algorithms to control the ground speed of the harvester.

Controller 50 is in communication with various actuators which it uses to control various parameters which affect harvester operation. An engine actuator 58 receives control signals from controller 50 and acts in response with the engine throttle to increase or decrease the engine speed. A header actuator 60 receives control signals from controller 50 and acts in response with the hydraulic motor 44 to increase or decrease the header speed. A speed actuator 62 receives control signals from controller 50 and acts in response on hydraulic motors 34 and 36 to increase or decrease the harvester's ground speed. Communication between controller 50 and sensors 52, 54 and 56 as well as actuators 58, 60 and 62 may be via wires (not shown) extending between the controller and the sensors and actuators, or wirelessly between radio frequency transmitters and receivers comprising the controller and the sensors and actuators.

An operator of the harvester 10 communicates and interacts with the control system 50 through an operator interface 64 located on the harvester. Interface 64 may take any number of practical forms, including, for example, a combination of video and analog displays for output of harvester parameters such as engine state (current engine speed, oil pressure, coolant temperature), header speed, hydraulic pump status, hydraulic motor status as well as traditional manual controls for steering, throttle, braking and inputs to engage and disengage the control system 50 for automatic ground speed control of the harvester according to the method of the invention.

Autonomous control of the harvester ground speed using an example method according to the invention is illustrated in FIG. 3. Autonomous control begins with the operator using the interface 64 to place the control system 50 in autonomous mode, which relinquishes ground speed control of the harvester to the control system 50; the operator need only steer the harvester. Basic method steps are illustrated in box 66 wherein the operator sets a maximum ground speed and the control system measures a current ground speed, engine speed and header speed and uses these parameters to increase or decrease the current ground speed of the harvester in response to the engine speed and the header speed to maintain efficient operation of the harvester. Boxes 68 through 82 illustrate criteria which the control system uses in autonomous mode.

As shown in box 68, the control system will increase the current ground speed if the current ground speed is less than the maximum ground speed, and the engine speed is greater than an engine speed lower limit, and the header speed is greater than a header speed lower limit.

In box 70, the engine speed is increased if the engine speed is less than an engine speed upper limit and the header speed is greater than a header speed lower limit.

As shown in box 72 the current ground speed is decreased if the current ground speed is greater than the maximum ground speed.

In box 74, the current ground speed is decreased if the engine speed is less than an engine speed lower limit.

As in box 76, the current ground speed is decreased if the header speed is less than a header speed lower limit. In box 78, a rate of decrease of the current ground speed is determined by the operator and the current ground speed is decreased by the control system at the determined rate of decrease.

Box 80 shows that the current ground speed is increased if the header speed is greater than a header speed lower limit and less than a header speed upper limit by a predetermined amount. In box 82, a rate of increase of the current ground speed is determined by the operator and the current ground speed is increased by the control system at the determined rate of increase.

Figure 4:
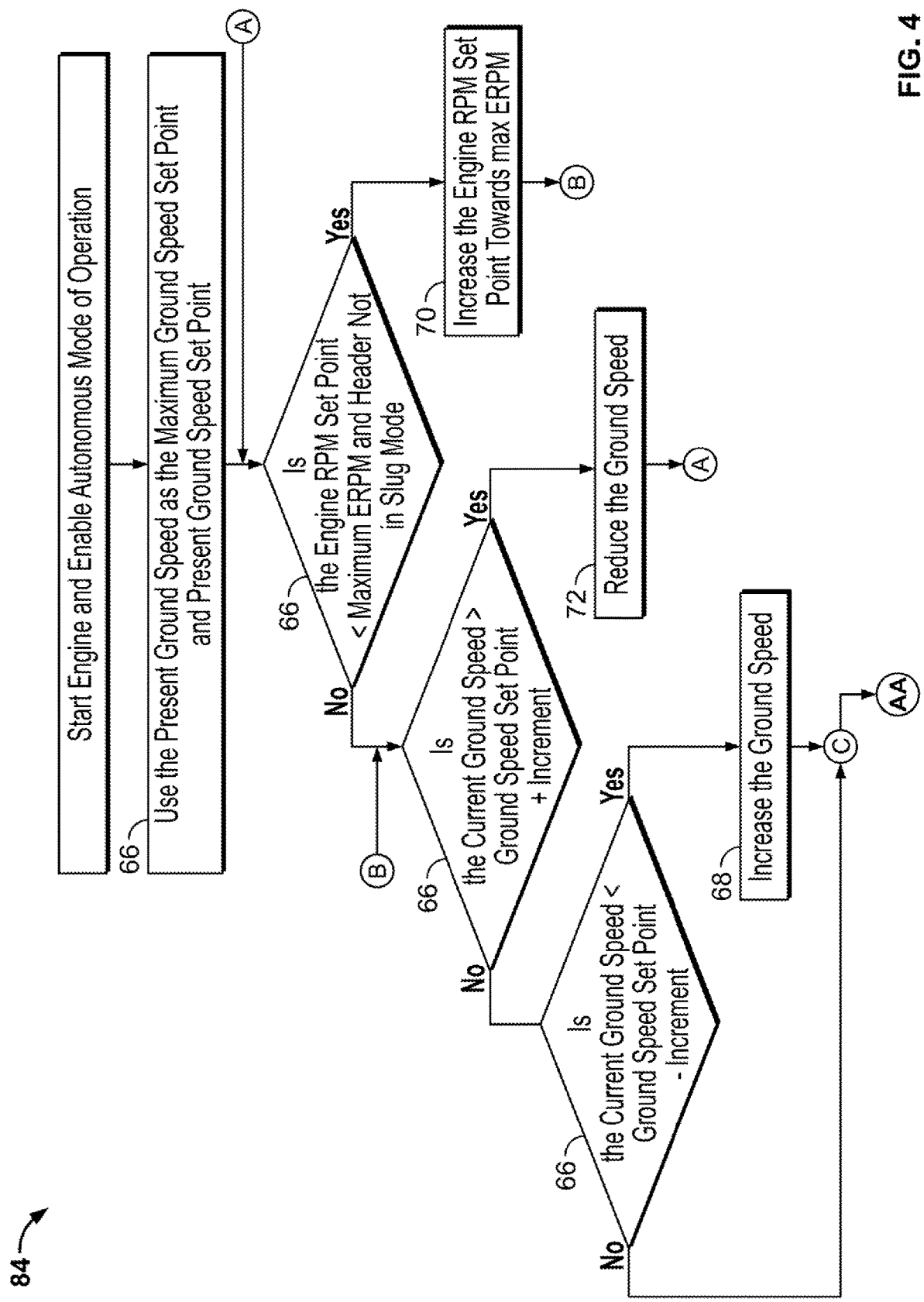
FIG. 4 is a flow chart which illustrates an example implementation of the method steps shown in FIG. 3.
Figure 4:
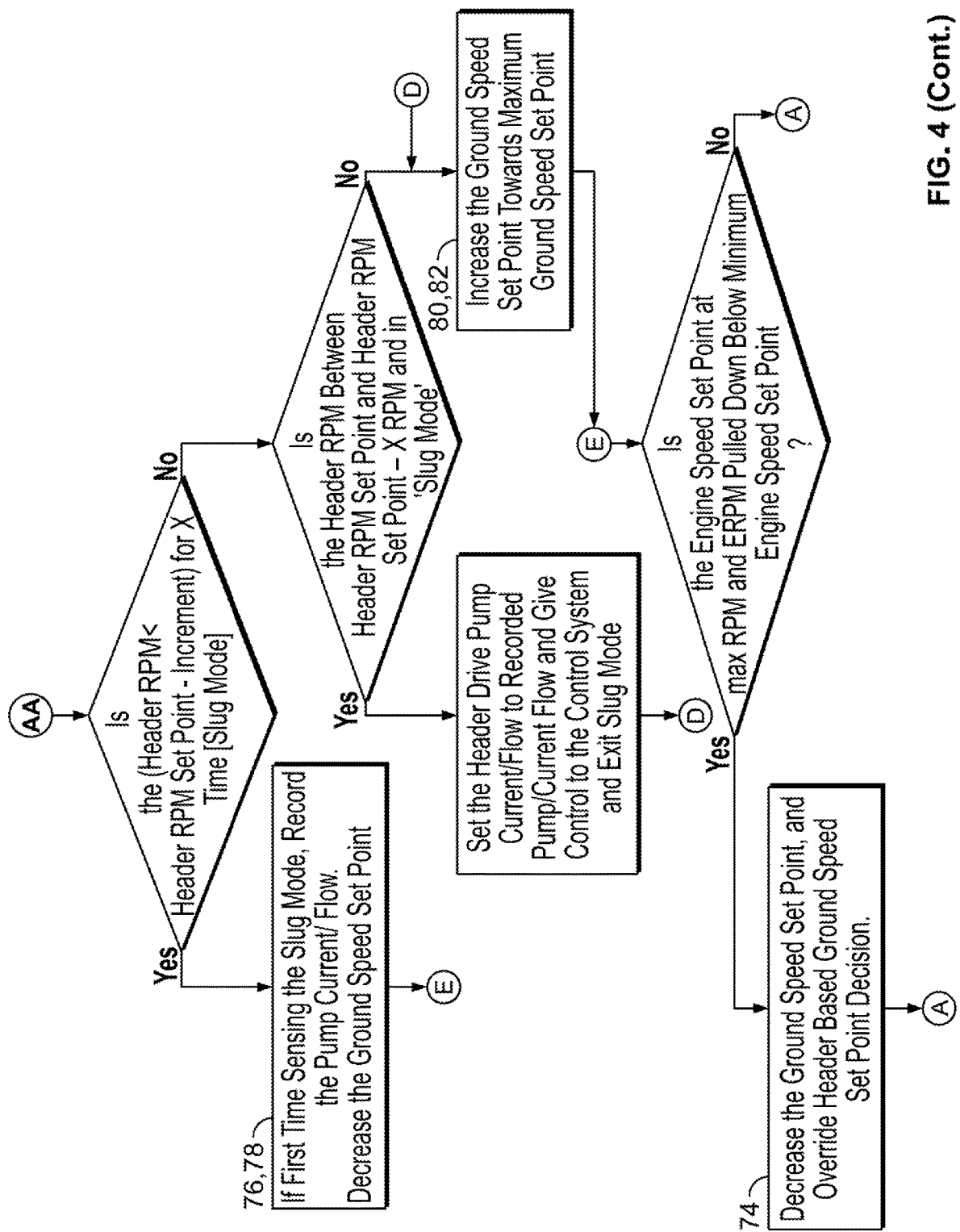

FIG. 4 illustrates a practical implementation 84 of the method steps of FIG. 3 and their logical relationships enabling autonomous control of the harvester ground speed as a function of engine speed and header speed. In the implementation reference is made to a "slug mode", which is an undesired mode of operation wherein the header cannot achieve its desired set point speed, resulting in poor crop quality. Autonomous recovery from slug mode is illustrated in the logic path beginning at point "C" in FIG. 4 wherein the slug mode is sensed by the control system when the header speed is less than the header set point speed for a predetermined period of time. If this is a new occurrence ("first time sensing") then the control system records the current flow to the hydraulic pump 46 of the header drive system 40 and reduces the harvester's ground speed. The control logic then passes to the path beginning at point "E" which considers the engine speed and then either further decreases the ground speed (74) or does not, and transfers back to point "A". On a subsequent trace through the implementation 84 when the path starting at point "C" is again invoked and the header speed is still below but within a predetermined range of the header set point, slug mode is exited by setting the hydraulic pump 46 to the flow recorded earlier and then increasing the harvester ground speed (80, 82). Control moves to the path beginning at point "E" again where engine speed is considered and either the command to increase the ground speed based upon the header speed is overridden and the ground speed is decreased (74) or control passes back to the path beginning at point "A".

Harvesters using control systems and control methods according to the invention are expected to increase the efficiency of harvester operation and decrease operator fatigue, leading to safer and more productive harvests.

What is claimed is:

1. A method for controlling the ground speed of a harvester comprising an engine and a header, said method comprising:
    setting a maximum ground speed;
    measuring a current ground speed;
    measuring engine speed;
    measuring header speed; and
    increasing said current ground speed if said current ground speed is less than said maximum ground speed, and said engine speed is greater than an engine speed lower limit, and said header speed is greater than a header speed lower limit.

2. A method for controlling the ground speed of a harvester comprising an engine and a header, said method comprising:
    setting a maximum ground speed;
    measuring a current ground speed;
    measuring engine speed;
    measuring
    header speed; and increasing or decreasing said current ground speed of said harvester in response to said engine speed and said header speed; and increasing said engine speed if said engine speed is less than an engine speed upper limit and said header speed is greater than a header speed lower limit.

3. The method according to claim 1, further comprising decreasing said current ground speed if said current ground speed is greater than said maximum ground speed.

4. The method according to claim 1, further comprising decreasing said current ground speed if said engine speed is less than an engine speed lower limit.

5. A method for controlling the ground speed of a harvester comprising an engine and a header, said method comprising:
    setting a maximum ground speed;
    measuring a current ground speed;
    measuring engine speed;
    measuring
    header speed; and increasing or decreasing said current ground speed of said harvester in response to said engine speed and said header speed; and decreasing said current ground speed if said header speed is less than a header speed lower limit.

6. The method according to claim 5, further comprising:
    determining a rate of decrease of said current ground speed; and
    decreasing said current ground speed at said rate of decrease.

7. A method for controlling the ground speed of a harvester comprising an engine and a header, said method comprising:
    setting a maximum ground speed;
    measuring a current ground speed;
    measuring engine speed;
    measuring
    header speed; and increasing or decreasing said current ground speed of said harvester in response to said engine speed and said header speed; and increasing said current ground speed if said header speed is greater than a header speed lower limit and less than a header speed upper limit by a predetermined amount.

8. The method according to claim 7, further comprising:
    determining a rate of increase of said current ground speed; and
    increasing said current ground speed at said rate of increase.

9. A harvester, said harvester comprising:
    a chassis having an engine and a plurality of wheels mounted thereon;
    a motive drive system operatively connecting said engine with at least one of said wheels for rotation thereof;
    a header attached to said chassis, said header having rotating elements;
    a header drive system operatively connecting said engine with said header for rotation of said rotating elements; and
    a control system comprising:
        an engine speed sensor for measuring engine speed;
        a header speed sensor for measuring rotational speed of said rotating elements;
        a speed sensor for measuring a current ground speed of said harvester;
        an engine actuator for controlling said engine speed;
        a header actuator for controlling said header speed;
        a speed actuator for controlling said current ground speed of said harvester;
        a controller including resident software, said controller being in communication with said engine speed sensor, said header speed sensor, and said speed sensor for receiving signals therefrom, said controller being in communication with said actuators for sending signals thereto; wherein
    wherein said controller is adapted to increase said current ground speed if said current ground speed is less than a maximum ground speed, and said engine speed is greater than an engine speed lower limit, and said header speed is greater than a header speed lower limit.

10. The harvester according to claim 9, wherein said controller is adapted to increase said engine speed if said engine speed is less than an engine speed upper limit and said header speed is greater than a header speed lower limit.

11. The harvester according to claim 9, wherein said controller is adapted to decrease said current ground speed if said current ground speed is greater than a maximum ground speed.

12. The harvester according to claim 9, wherein said controller is adapted to decrease said current ground speed if said engine speed is less than an engine speed lower limit.

13. The harvester according to claim 9, wherein said controller is adapted to decrease said current ground speed if said header speed is less than a header speed lower limit.

14. The harvester according to claim 13, further comprising an operator interface providing communication between an operator of said harvester and said controller, said controller being adapted to decrease said current ground speed at a rate of decrease determined by said operator of said harvester.

15. The harvester according to claim 9, wherein said controller is adapted to increase said current ground speed if said header speed is greater than a header speed lower limit and less than a header speed upper limit by a predetermined amount.

16. The harvester according to claim 15, further comprising an operator interface providing communication between an operator of said harvester and said controller, said controller being adapted to increase said current ground speed at a rate of increase determined by said operator of said harvester.

17. The harvester according to claim 9, wherein said header is mounted on said chassis.

18. The harvester according to claim 9, wherein said header is attached to said chassis and towed thereby.

* * * * *